Oct. 6, 1925.    　　　　　　　　　　　　　　　1,555,860
J. LEDWINKA
METHOD OF AND APPARATUS FOR BAKING COATINGS ON METALLIC BODIES
Filed Feb. 19, 1921        3 Sheets-Sheet 2
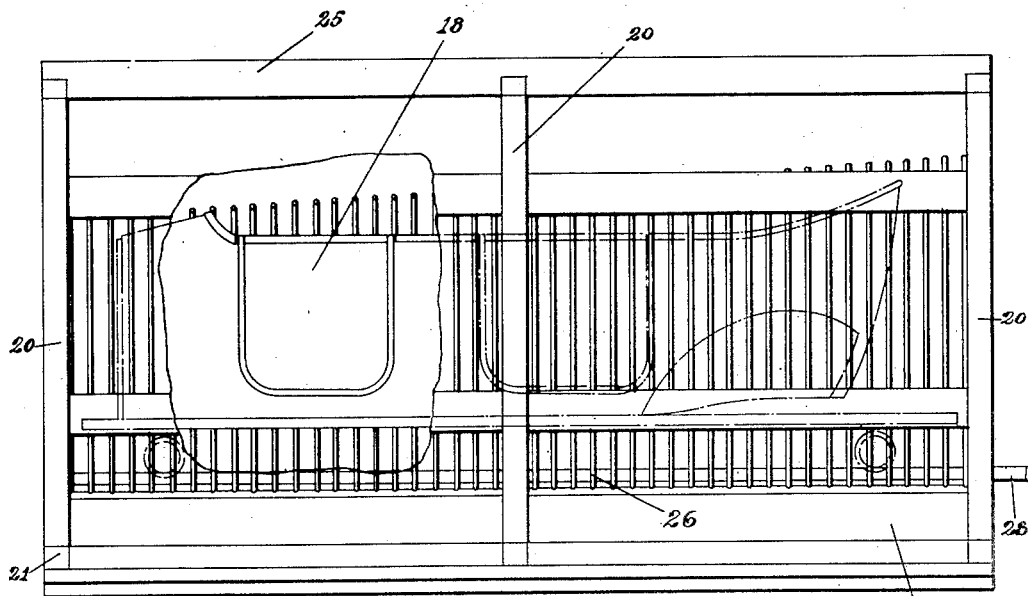
Fig II
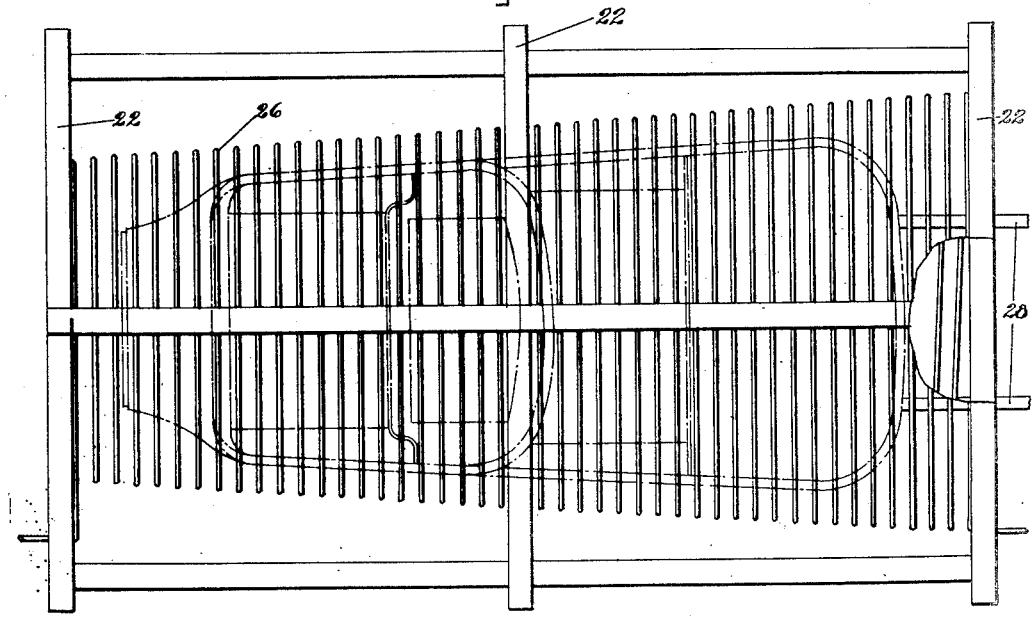
Fig III
WITNESS:                              INVENTOR.
                              JOSEPH LEDWINKA
                              BY
                              ATTORNEY.

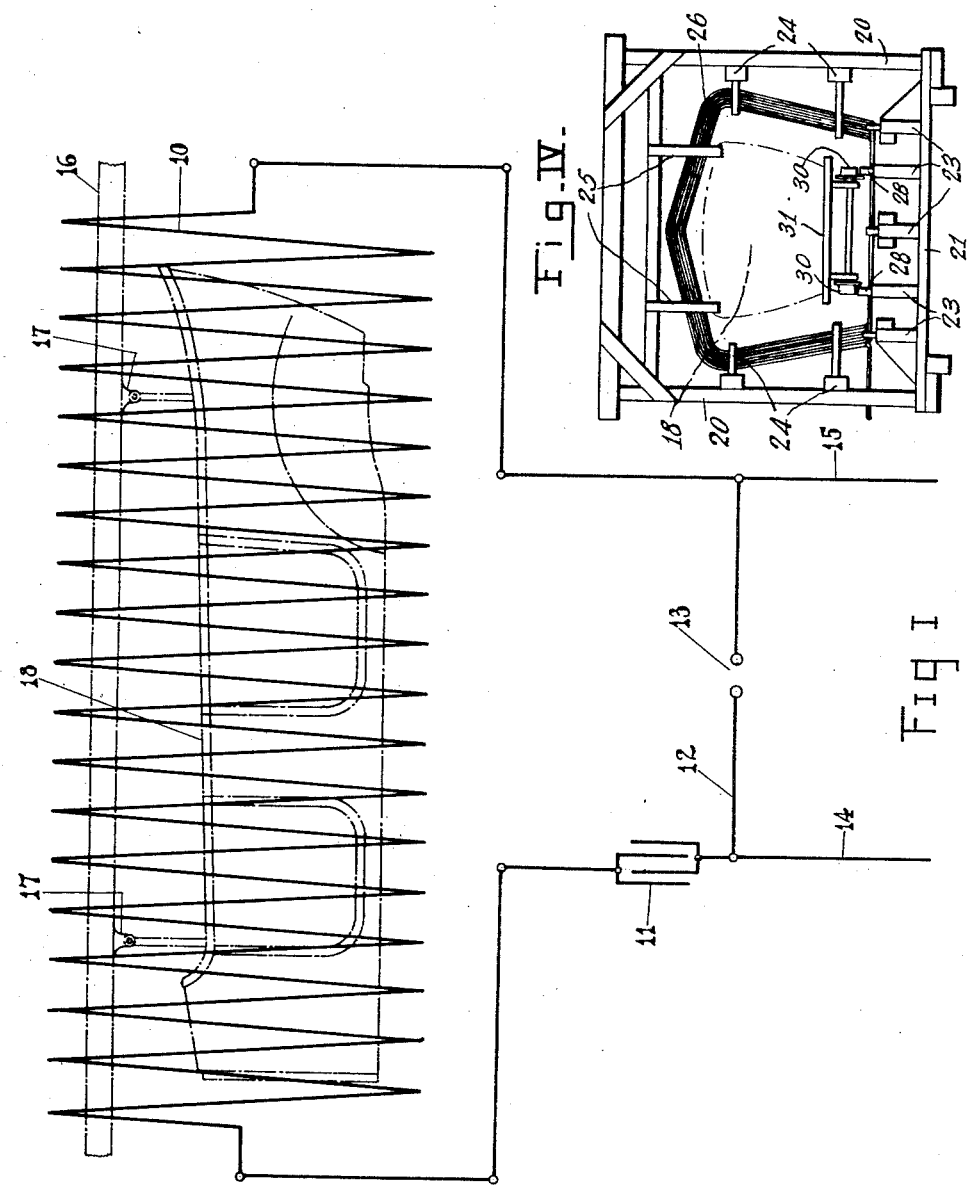

Oct. 6, 1925.
J. LEDWINKA
1,555,860
METHOD OF AND APPARATUS FOR BAKING COATINGS ON METALLIC BODIES
Filed Feb. 19, 1921   3 Sheets-Sheet 3
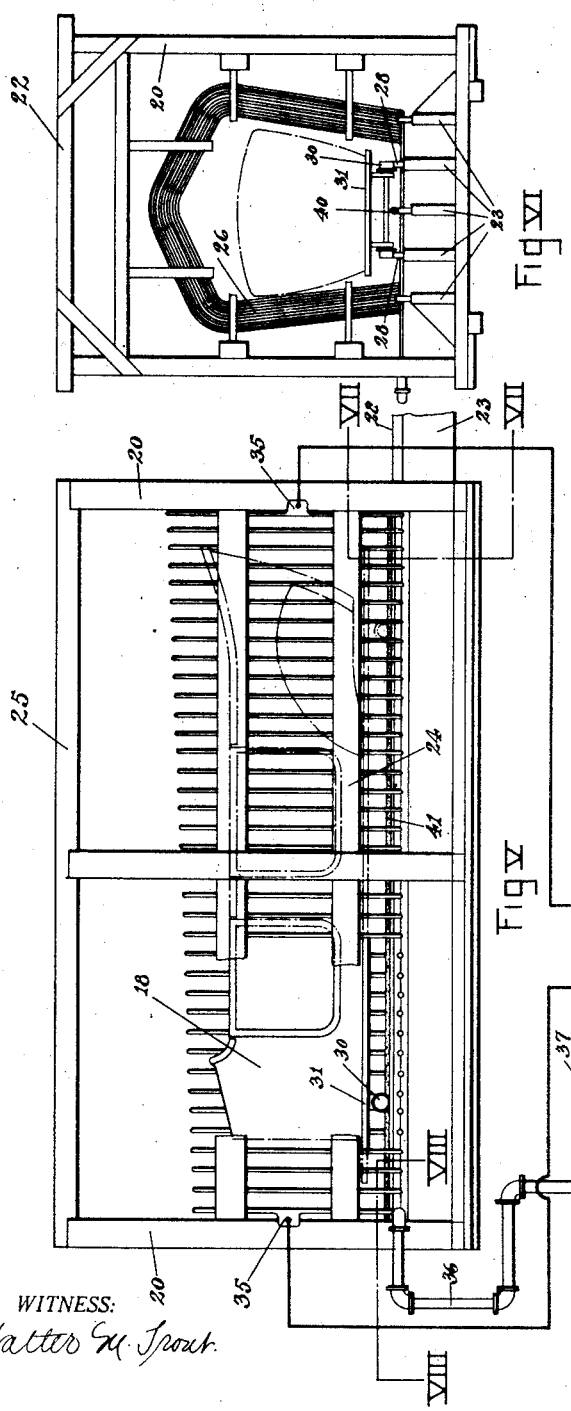
INVENTOR.
JOSEPH LEDWINKA
BY C. B. Desjardins
ATTORNEY.
WITNESS:
Walter M. Sprout.

Patented Oct. 6, 1925.

1,555,860

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

METHOD OF AND APPARATUS FOR BAKING COATINGS ON METALLIC BODIES.

Application filed February 19, 1921. Serial No. 446,375.

*To all whom it may concern:*

Be it known that I, JOSEPH LEDWINKA, residing at Philadelphia, county of Philadelphia, Pennsylvania, have invented certain new and useful Improvements in Methods of and Apparatus for Baking Coatings on Metallic Bodies, of which I declare the following to be a full, clear, and exact description.

This invention relates to an improved method of and apparatus for baking coatings on metallic bodies.

The object of the invention is to provide an improved method of and apparatus for baking coatings, such as paint, varnish, enamel, or the like, upon bodies which are made wholly or in part of electrically conductive material.

A further object of the invention is to provide a method and apparatus for the purpose referred to which is simple, efficient and economical, and which produces a finished product economically with a coating applied to such product baked thereon uniformly and in a more durable and substantial manner than by methods heretofore employed.

A further object of the invention is to utilize the heating action of the electric currents induced in a body constructed of or containing electrically conductive material for the purpose of baking a coating or coatings applied to such body.

A further object of the invention is to create a field of force through the action of high frequency electrical oscillations, and to utilize such field of force to induce heating currents in a body or article, to the surface of which a coating of paint, varnish, enamel, or the like, has been applied for the purpose of baking such coating upon said surface.

A specific object of the invention is to provide a method and apparatus particularly suitable and efficient for baking the coatings of enamel or other coating compositions on automobile bodies.

Other objects of the invention will appear more fully hereinafter.

The invention consists substantially in the combination, construction, arrangement, and mode of operation hereinafter to be more fully set forth, as shown in the accompanying drawings, and finally pointed out in the appended claims.

Referring to the drawings:—

Fig. I is a view in diagram of one form of apparatus and of the circuit connections therefor embodying the principles of my invention and suitable for carrying out my process.

Fig. II is a view of the apparatus in side elevation, a portion of one side thereof being broken away to disclose the article or body, shown in this instance as an automobile body, in position to be acted upon in the process of baking a coating applied to the surface thereof.

Fig. III is a top plan view of the apparatus shown in Fig. II, the article under treatment being indicated in dotted lines, and a portion of the helix or coil for producing the field of force in accordance with my invention being broken away to disclose the lower part of such helix or coil.

Fig. IV is a view in end elevation of the apparatus shown in Figs. II and III.

Fig. V is a view, partly diagrammatic and partly in side elevation, showing another embodiment of my invention.

Fig. VI is a view in end elevation of the apparatus shown in Fig. V.

Fig. VII is a broken detail view in section on the line VII—VII, Fig. V, looking in the direction of the arrows.

Fig. VIII is a similar view on the line VIII—VIII, Fig. V, looking in the direction of the arrows.

The same part is designated by the same reference numeral wherever it occurs throughout the several views.

In carrying out and accomplishing the objects and purposes of my invention I create a field of force, to the influence of which is subjected an article or body constructed of or containing electrically conductive material, to the surface of which conductive material a coating or coatings of paint, varnish, enamel, or the like, has or have been applied. By thus subjecting such article or body to a suitable field of force electric currents are induced in the conductive parts of the article or body, the effect of which is to heat such article or body to the desired degree to accomplish the baking of the coating applied thereto upon the surface of such conductive parts. The field of force, to the influence of which the body or bodies are subjected to accomplish the baking action, may be created in many different ways. I have found it efficient to employ for this purpose a conductor arranged in the form of a helix or coil disposed in such relation to the article or body to be baked as to surround the same but out of contact therewith, and I propose to supply such helix or coil with high frequency electrical oscillations to create a field of force surrounding the article or body to be treated and to induce in such article or body electric heating currents therefor. The electric oscillations may be generated and supplied to the coil or helix in any suitable or convenient manner and from any suitable source of generation.

In Fig. I I have shown diagrammatically one simple arrangement wherein the conductor 10 is formed into a helix or coil, and the terminals of which are connected to the source of generation of high frequency oscillations, such for example as a spark or arc gap indicated at 13, supplied with current from a source, not shown, through leads 14, 15, and which arc or spark gap is in shunt to a condenser 11 and an inductance. I have shown only a conventional form of high frequency oscillation generator, and my invention does not reside in any particular form of such generator. The important feature is to include the helix or coil portion into which the conductor 10 is formed in an oscillating circuit, to which oscillating currents are delivered, and preferably to which are delivered high frequency oscillating currents. The article or body 18, which for the purposes of illustrating my invention is shown in the form of an automobile body, is disposed within so far as to be surrounded by the helix or coil into which the conductor 10 is formed, so as to be exposed to the action of the field of force generated by the oscillations in said coil. One convenient way of disposing the article or body within said coil is to suspend the same therein by means of hangers indicated at 17 arranged to operate or run along on a track 16.

In Figs. II, III, and IV, I have illustrated one form of apparatus suitable for carrying out my invention wherein a framework or cage is employed including suitable uprights 20, lower cross members 21, and upper cross members 22 connecting said uprights. Base stringers 23, side stringers 24, and upright stringers 25 complete in a general way the form of framework shown. The conductor is formed into a coil or helix indicated at 26, the conductor being continuously coiled to form such helix. This coil is mounted within the framework or cage but insulated therefrom, said coil being supported in any suitable or convenient manner within the cage or framework.

In practice, and in order to secure a fair degree of uniformity in the heating action generated within the article or body by the field of force surrounding it, it is of course desirable that the surrounding helix or coil conform generally to the shape and contour of the article or body to be treated. For instance, in the case of an automobile body the general shape is more or less of a taper from end to end, and therefore the helix or grid should taper from end to end in, roughly, the degree of taper of the automobile body. A convenient arrangement for handling articles to be acted upon in the field of force referred to is afforded, as above stated, by suspending the article from a track member indicated at 16 in Fig. 1, which extends lengthwise of the helix or coil, and which may be suspended from the upper longitudinal stringer 25 of the framework and suitably insulated from such stringer, as for instance, by insulators 28. The article to be treated may be suspended from the track 16 by hangers 17 having rollers operating along the track 16. Another very satisfactory arrangement for supporting the body within the helix is shown in Figs. II, III and IV, in which the body is supported on a wooden truck, 31, having wheels, 30, running on the wooden tracks, 28, extending within the lower part of the helix. Where the article to be treated is of symmetrical contour from end to end the articles may be progressed longitudinally through the coil or helix while being subjected to the heating action of the field for force created by such helix or coil. Where, however, an irregularly shaped article or body, such for example, as an automobile body, is to be treated, which is of generally tapered shape, the article is advanced into the coil which generally is conformed to the same taper, and when the baking operation is completed is withdrawn from such coil to be replaced by another article to be treated. In practice it is of course desirable to maintain the line of progression into or through the helix or coil substantially along the geometric center of the helix or coil so as to maintain approximately, or as nearly as may be, an equal distance of all parts of the surface of the body or article, from the interior surface of the helix or coil.

In Figs. V, VI, VII and VIII, I have shown an apparatus embodying the same general principles as above set forth, and, in addition, I have provided means which accomplish the combined function of cooling the conductor in case it should become heated through its ohmic resistance, and also of aiding in the drying or baking operation. To accomplish this purpose I employ a hollow conductor 34 and deliver a cooling medium therethrough, such for instance, as a current of air, and such air after traversing the convolutions of the coil or helix and becoming heated by absorbing heat from such conductor, is delivered upon the article or body under treatment, thereby materially aiding or assisting in the baking and drying operations. To this end I employ a suitable blower or fan 37 which delivers air through a pipe connection 36 to one end of the hollow conductor forming the coil or helix 26. The other end of the conductor has connected thereto a perforated pipe 40 which is extended lengthwise of the coil and preferably at a point in convenient relation to the article or body to be treated, for instance, beneath such body. The air traversing the hollow conductor and becoming heated is directed through the perforations 41 of the pipe section 40 against the article or body under treatment. If desired, and in order to avoid the objection of particles of dust or other substance being carried along with the current of air and being jetted onto the surface of the body which might thereby mar the enameling or appearance of the enameled finished product, the air may be drawn by the blower 37 through a washing apparatus indicated at 39 to which is connected an air intake pipe connection 38. The coil in this arrangement is provided at its opposite ends with terminals 35 to which are connected the circuit leads of the oscillating circuit, of which the conductor of the coil forms a part. In this arrangement I have also shown a transformer for supplying current to the spark or arc gap 13, the primary 33 of the transformer receiving current from any suitable source, and the secondary 32 of the transformer being connected in circuit with the spark or arc gap.

From the foregoing description it will be seen that the article or body to be treated is disposed and arranged with relation to the helix or coil in a manner similar to the secondary of the transformer, that is, such article or body is surrounded by but is out of electrical contact with the helix or coil, and therefore is subjected to the action of the field or force created by the high frequency oscillations in the circuit of which the helix or coil forms a part. The result is that electric currents are induced within the metallic or conductive parts of the article or body under treatment, which induced currents are practically uniform throughout such metallic or conductive parts and which heat such parts, and I have found that such action is sufficient to heat the metalic parts of the article or body to a degree of enameling temperature, so that by submitting or subjecting an article or body to which a coating of paint, varnish, enamel, or other composition is applied to the field of force within the coil or helix referred to such coating becomes baked upon the surface of such article or body uniformly and regularly throughout the same. I have found that an enameled coating thus applied to and baked upon an article or body is superior in finish and appearance to the results heretofore obtained by other methods with which I am familiar. I have found that this action is not due to a heating action caused by an electric current traversing a circuit which includes the article or body to be baked and which depends upon the ohmic resistance of the body as I have found that it is not practical to secure uniform results and baking action by employing the heat developed within a conductive material in this manner because of irregularities and variations in the texture and nature of the resistance characteristics of metallic bodies and of the component parts thereof. It is my belief that the excellent results obtained in the use of my invention is due to the fact that the baking heat developed is generated within the body itself so that the coating applied to the surface of the article or body is dried or baked from the inside outwardly instead of from the outside inwardly where enameling heat is externally applied to the body. I have also found that a satisfactory baking temperature is not attained where the article or body to be treated is interlinked with or constitutes a part of the core or path for the magnetic flux for the reason that here again the heating action is irregular and not uniform. In the practice of my invention, however, uniform heating effect throughout the article or body to be baked is attained even where such article or body is of irregular outline. Moreover, I am enabled to attain my results in an arrangement of apparatus which is very simple, and wherein the introduction, positioning and removal and replacement of the work, article or body is accomplished easily, quickly, and without in any manner disturbing the coil or helix or its connections.

In the practical use of my invention I have found that articles or bodies composed in part of metallic, electric conductive members, and in part of wooden members, may be subjected to the enameling heat and action of the process without injuring or destroying the wooden or other combustible parts of such article or body. This is not possible where, according to present methods, bodies are subjected to the high temperatures to secure enameling through the application of externally applied furnaces or other forms of baking ovens or heating appliances, and consequently my invention is particularly applicable to the baking of coatings on composite automobile bodies which include metal stampings mounted upon a wooden framework.

It will be understood that many variations and changes in details might readily occur to persons skilled in the art and still fall within the spirit and scope of my invention. I do not desire therefore to be limited or restricted to the exact details of structure, arrangement or modes of operation as shown and above set forth.

Having thus described my invention, what I claim as new and desire to secure by Letters Patent, is:—

1. The method of baking a coating on a body comprising conducting material which consists in inducing electric heating currents within the conducting material of such body.

2. The method of baking a coating on a body comprising conducting material including subjecting said body to a field of force serving to induce electric heating currents within the conducting material of said body.

3. The method of baking a coating on a body comprising conducting material including subjecting said body to a field of force generated by a high frequency oscillating current to induce electric heating currents within the conducting material of said body.

4. The method of baking a coating on a body comprising conducting material including inducing rapidly reversing electric heating currents within the conducting material of said body.

5. The method of baking a coating on an article comprising conducting material including inducing electric heating currents within the conducting material of said body and simultaneously directing a current of heated air against said body.

6. The method of baking a coating on a body comprising conducting material including the generation of a field of force to induce electric currents within the conducting material of said body, utilizing the means for the generation of said field of force to heat a current of air and directing the heated air against said body.

7. An apparatus for baking a coating applied to a body comprising conducting material, including a heating coil connected in a suitable electric circuit and means for suspending said body within the coil, whereby said body is subjected to the electro-static action of the resulting field of force.

8. An apparatus for baking a coating on a body comprising conducting material, including a coil, means for generating an oscillating heating current in said coil, and means for suspending the body within said coil.

9. An apparatus for baking a coating applied to a body of conducting material including a coil, means for generating an oscillating heating current of high frequency in said coil, and means for supporting said body within the coil.

10. An apparatus for baking a coating on a body comprising conducting material including a coil, tapered to conform to said body, means for generating an oscillating heating current within said coil, and means for supporting said body within said coil so that the side portions of the body are at substantially uniform distances from the wall of the coil.

11. An apparatus for baking a coating on a body comprising conducting material including a coil, means for generating an oscillating current of high frequency within said coil, and means for positioning said body with the conducting material thereof adjacent said coil and subjecting it to the eletro-static field of force generated thereby, so as to induce electric heating currents within said conducting material.

12. An apparatus for baking a coating on a body comprising conducting material, including a coil connected in a suitable electrical circuit, means for positioning the body in a field of force generated by said coil, means for heating a current of air from said coil, and means for directing said current of air against said body.

13. An apparatus for baking a coating applied to a body comprising conducting material, including a coil, means for generating an oscillating current of high frequency in said coil, mechanism for positioning said body with the conducting material thereof in the field of force generated by said coil, and means for directing a current of air heated by said coil against said body.

14. An apparatus for baking a coating on a body comprising conducting material, including a coil formed of a tubular conductor, means connecting said tubular conductor in an electric heating circuit, means for positioning said body within the field of force generated by said coil, and means for forcing a current of air through said tubular conductor and directing said air against the body.

15. The method which consists in applying a coating to a body of electrically conductive material and then inducing electric heating currents within the body to bake the coating thereon.

16. The method which consists in applying a coating to a body of electrically conductive material and then inducing high frequency electric heating currents within the body to bake the coating thereon.

17. The method which consists in applying a coating to a body of electrically conductive material and then subjecting such body to the action of an electro-static field of force operating to induce electric heating currents within such body to bake the coating thereon.

18. The method which consists in applying a coating to a body of electrically conductive material and then heating such body by inducing electric currents therein to bake the coating thereon.

19. The method which consists in applying a coating to a body of electrically conductive material and then heating such body by inducing high frequency electric currents therein to bake the coating thereon.

20. The method which consists in applying a coating to a body of electrically conductive material and then disposing such coated body in electro-static relation with respect to a field of force adapted to heat the same.

21. The method which consists in applying a coating to a body of electrically conductive material and then disposing the coated body within an electro-static field of force generated by high frequency electrical oscillations to heat the same.

22. The method which consists in applying a coating to a body having electrically conducting portions, then surrounding such body by a helix or coil and supplying such helix or coil with electrical oscillations, to produce an electro-static field of force around such body to heat the same.

23. The method which consists in applying a coating to a body having electrically conducting portions, then surrounding such body by a helix or coil and supplying such helix or coil with high frequency electrical oscillations to heat the same.

24. The method of baking a coating on a body of electrically conductive material, which consists in subjecting such body to the heating effect of a field of force without magnetic interlinkage therewith.

25. The method of baking a coating on a body of electrically conductive material, which consists in subjecting such body to the heating effect of an electro-static field of force.

In testimony whereof, I affix my signature.

JOSEPH LEDWINKA.